US008516186B2

(12) United States Patent
Fukui et al.

(10) Patent No.: US 8,516,186 B2
(45) Date of Patent: Aug. 20, 2013

(54) METHOD OF ACCELERATING ACCESS TO PRIMARY STORAGE AND STORAGE SYSTEM ADOPTING THE METHOD

(75) Inventors: Shingo Fukui, Nagoya (JP); Suguru Ishii, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 309 days.

(21) Appl. No.: 13/023,281

(22) Filed: Feb. 8, 2011

(65) Prior Publication Data

US 2011/0197019 A1    Aug. 11, 2011

(30) Foreign Application Priority Data

Feb. 10, 2010   (JP) .................... 2010-27558

(51) Int. Cl.
*G06F 12/00*    (2006.01)
(52) U.S. Cl.
USPC .................... 711/104; 711/E12.001
(58) Field of Classification Search
USPC .......................... 711/104, E12.001
See application file for complete search history.

(56) References Cited

U.S. PATENT DOCUMENTS 6,032,240 A * 2/2000 Brown .......................... 711/173

FOREIGN PATENT DOCUMENTS

JP    11-85607    3/1999

OTHER PUBLICATIONS

Notification of Reason for Rejection dated Aug. 16, 2011 from Japanese Application No. 2010-027558.
Yoshiyasu Hirasawa, Special Report: "Using a OS unmanaged area of 32bit Windows for a RAM Disk," PC Watch (Online), May 12, 2008, pp. 1-4, http://pc.watch.impress.co.jp/docs/2008/0512/ramdisk.htm.
"The site for the guidance about computer peripherals for beginners; Please teach me about the peripherals! Let's speed up your computer's performance with a RAM Disk.", Dec. 2009, pp. 1-5, http://buffalo.jp/products/oshiete/special/ramdisk/.

* cited by examiner

*Primary Examiner* — Jasmine Song
(74) *Attorney, Agent, or Firm* — Beyer Law Group LLP (57) ABSTRACT

A RAM disk driver 112 receives the user's specification for the capacity of a RAM disk 122 via an operation screen image 10 (step S20). The RAM disk driver 112 sets a continuous region in an OS invisible area, which is beyond management of an operating system installed in a computer, on a RAM 120 for a storage area of the RAM disk 122 having the user's specified capacity (step S30). When the user's specified capacity is greater than the capacity of the OS invisible area on the RAM 120, the RAM disk driver 112 reduces the range of an OS visible area, which is managed by the operating system, on the RAM 120 and sets the storage area of the RAM disk 122 in the expanded OS invisible area. This arrangement effectively boosts up access to the RAM 120 as the primary storage in the computer.

6 Claims, 11 Drawing Sheets

Fig.1

FIRST EMBODIMENT

FIRST EMBODIMENT

Fig.6A FIRST COMPARATIVE EXAMPLE

Fig.6B SECOND COMPARATIVE EXAMPLE

Fig.7

SECOND EMBODIMENT

SECOND EMBODIMENT

EXAMPLE OF SETTINGS IN REGISTRY

| NAME | TYPE | DETAILS | |
|---|---|---|---|
| EnableOver4G | REG_DWORD | 0 | : OS INVISIBLE AREA IS UNAVAILABLE |
| | | 1 | : OS INVISIBLE AREA IS AVAILABLE |
| StartAddr | REG_DWORD | STARTING PHYSICAL ADDRESS OF FREE MEMORY SPACE AVAILABLE FOR SSD CACHE SPACE | |
| CacheSize | REG_DWORD | CAPACITY AVAILABLE FOR SSD CACHE SPACE | |

Fig.10

SECOND EMBODIMENT
SSD DRIVER

SECOND EMBODIMENT

METHOD OF ACCELERATING ACCESS TO PRIMARY STORAGE AND STORAGE SYSTEM ADOPTING THE METHOD

CROSS REFERENCE TO RELATED APPLICATION

The present application claims the priority based on Japanese Patent Application No. 2010-027558 filed on Feb. 10, 2010, the disclosure of which is hereby incorporated by reference in its entirety.

BACKGROUND OF THE INVENTION

1. Field of the Invention

The present invention relates to access to a primary storage in a computer.

2. Description of the Related Art

An operating system or OS installed in a computer generally manages a memory area on a primary storage. In response to a request for allocation of a portion of the memory area on the primary storage from each of programs executed in the computer, the OS allocates a region of a specific capacity corresponding to the request out of a free memory space in the memory area on the primary storage. On end of execution of the program that has made the request for allocation of the portion of the memory area, the OS deallocates the allocated region on the primary storage. Repeated allocation and deallocation causes the memory area on the primary storage to be divided into multiple small regions, which are to be allocated to the respective programs.

There is a known technique called 'RAM disk' that utilizes a portion of the memory area on the primary storage as a virtual external storage (see, for example, Japanese Patent Laid-Open No. H11-85607). In the case where the RAM disk is to be set on the primary storage, the division of the memory area on the primary storage into the multiple small regions as mentioned above causes multiple small divisions of the memory area on the primary storage to be allocated to the storage area of the RAM disk. The division of the memory area causes to lower the access speed when the user accesses the RAM disk.

SUMMARY OF THE INVENTION

Application Example 1

A method of accelerating access to a primary storage by utilizing an invisible memory area, which is beyond management of an operating system installed in a computer, out of a memory area on the primary storage in the computer, comprising the steps of:

(a) causing first software that utilizes a portion of the memory area on the primary storage as a RAM disk to receive a user's setting operation for specifying a capacity of the RAM disk; and (b) causing the first software to assign, on a start up of the computer, a continuous region in the invisible memory area as a storage area of the RAM disk having the capacity specified by the user's setting operation, wherein the step (b) causes the first software to change a range of a visible memory area, which is managed by the operating system, out of the memory area on the primary storage according to the user's specified capacity of the RAM disk received in the step (a) to thereby assign the continuous region in the invisible memory area as the storage area of the RAM disk.

The method according to this Application Example 1 enables the continuous region in the invisible memory area on the primary storage to be allocated to the storage area of the RAM disk having the user's specified capacity. This arrangement effectively enhances the access speed to the RAM disk on the primary storage.

Application Example 2

The method in accordance with claim 1, further comprising the steps of:

(c) causing the first software to write into a registry a range of a free memory space in the invisible memory area, which is not allocated to the storage area of the RAM disk; and (d) causing second software to assign a cache space, which is used for an external storage of the computer, preferentially from the free memory space of the invisible memory area, based on the range of the free memory space written into the registry in the step (c).

The method according to this Application Example 2 enables the continuous region in the invisible memory area to be allocated to the RAM disk and to the cache space for the external storage, such as a solid state drive. This arrangement of the method effectively boosts up the access to the RAM disk, while enhancing the user's 'perceived' access speed to the external storage. And this method utilizes the registry as means adopted by the first software to inform the second software of the free memory space in the invisible memory area. This arrangement effectively avoids the occurrence of a potential error due to overlapped allocation of an identical region in the invisible memory area, which is beyond management by the operating system, by two different programs, the first software and the second software.

Application Example 3

A storage system adopted in a computer, comprising:

a primary storage a portion of which is managed by an operating system installed in the computer; and first software arranged and adapted to utilize a portion of a memory area on the primary storage as a RAM disk, wherein the first software includes:

an interface module arranged and adapted to receive a user's setting operation for specifying a capacity of the RAM disk; and a storage area setting module arranged and adapted to assign, on a start up of the computer, a continuous region in the invisible memory area as a storage area of the RAM disk having the capacity specified by the user's setting operation, wherein the storage area setting module is arranged and adapted to change a range of a visible memory area, which is managed by the operating system, out of the memory area on the primary storage according to the user's specified capacity of the RAM disk received by the interface module and to assign the continuous region in the invisible memory area as the storage area of the RAM disk.

Application Example 4

The storage system in accordance with claim 3, further comprising:

second software arranged and adapted to use a portion of the memory area on the primary storage for a cache space for an external storage of the computer, wherein the first software is arranged and adapted to write into a registry a range of a free memory space in the invisible memory area, which is not allocated to the storage area of the RAM disk; and the second software is arranged and adapted to assign the cache space, which is used for the external storage, preferentially in the free memory space in the invisible memory area, based on the range of the free memory space written into the registry by the first software.

The technique of the invention may be actualized by diversity of applications, for example, the method of accelerating the access to the primary storage and the storage system configured by implementation of the method as described above, as well as computer programs executed to implement the functional steps of the method or the functions of the system and recording media in which such computer programs are recorded.

DESCRIPTION OF THE PREFERRED EMBODIMENTS

A. First Embodiment

Figure 1:
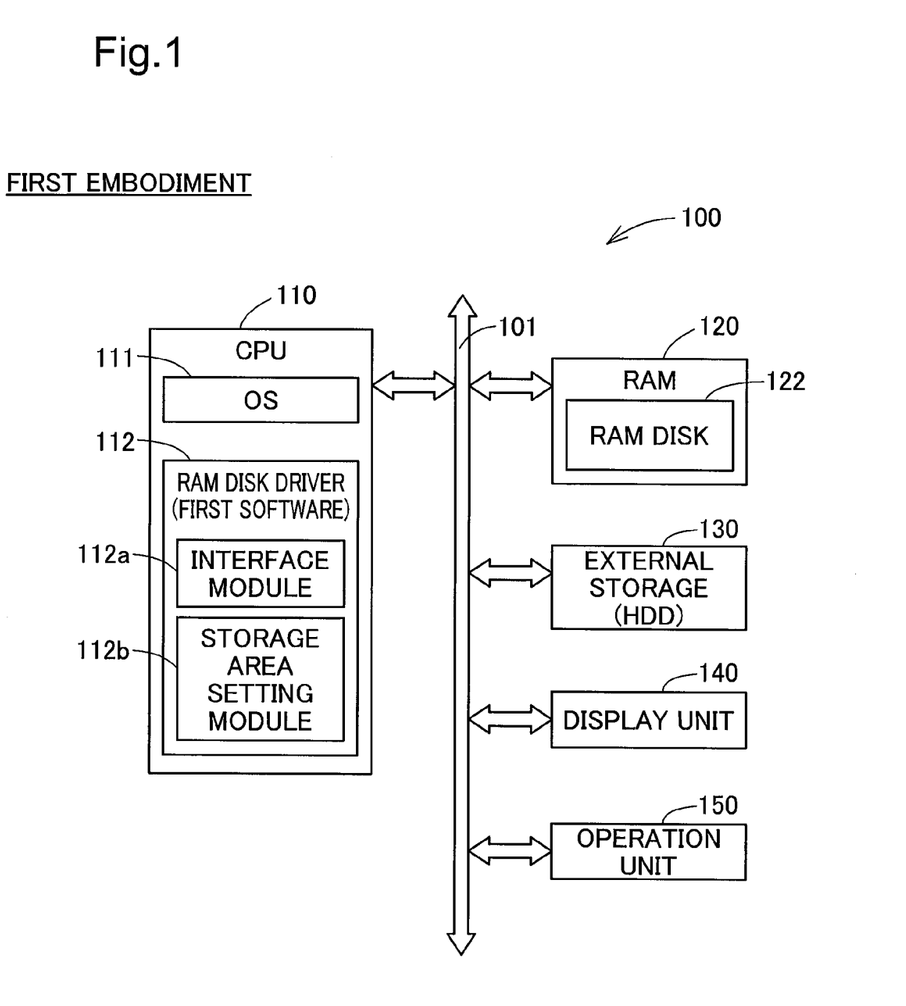
FIG. 1 is a schematic representation of the configuration of a computer according to a first embodiment of the invention.

FIG. 1 is a schematic representation of the configuration of a computer 100 according to a first embodiment of the invention. The computer 100 includes a CPU (central processing unit) 110, a RAM (random access memory) 120 as a primary storage, an external storage 130, a display unit 140, and an operation unit 150. The respective components 110 through 150 are interconnected via an internal bus 101.

The CPU 110 reads out an OS (operating system) 111 and other programs (not shown) stored in the external storage 130, and loads and executes the programs on the RAM 120. In the illustrated state of FIG. 1, the CPU 110 executes the OS 111 and a RAM disk driver 112 provided as a type of device driver. The RAM disk driver 112 is corresponding to first software of the invention. The RAM disk driver 112 includes an interface module 112a and a storage area setting module 112b. The functions of the RAM disk driver 112 will be described later. In this embodiment, a 32-bit OS, such as Windows XP (registered trademark by Microsoft Corporation), is implemented on the computer 100.

The RAM 120 is a volatile memory having a memory area whose allocation and deallocation are managed by the OS 111. In the illustrated state of FIG. 1, a RAM disk 122 is set in a portion of the memory area in the RAM 120. The RAM disk 122 will be described in detail later. The external storage 130 is a non-volatile memory device implemented as a hard disk drive (HDD) and stores therein the OS 111 and various programs, as well as setting data utilized by the respective programs. The display unit 140 is implemented as a display device, such as a liquid crystal display. The operation unit 150 is implemented as an input device, such as a keyboard and a mouse, and receives the user's operations.

Figure 2:
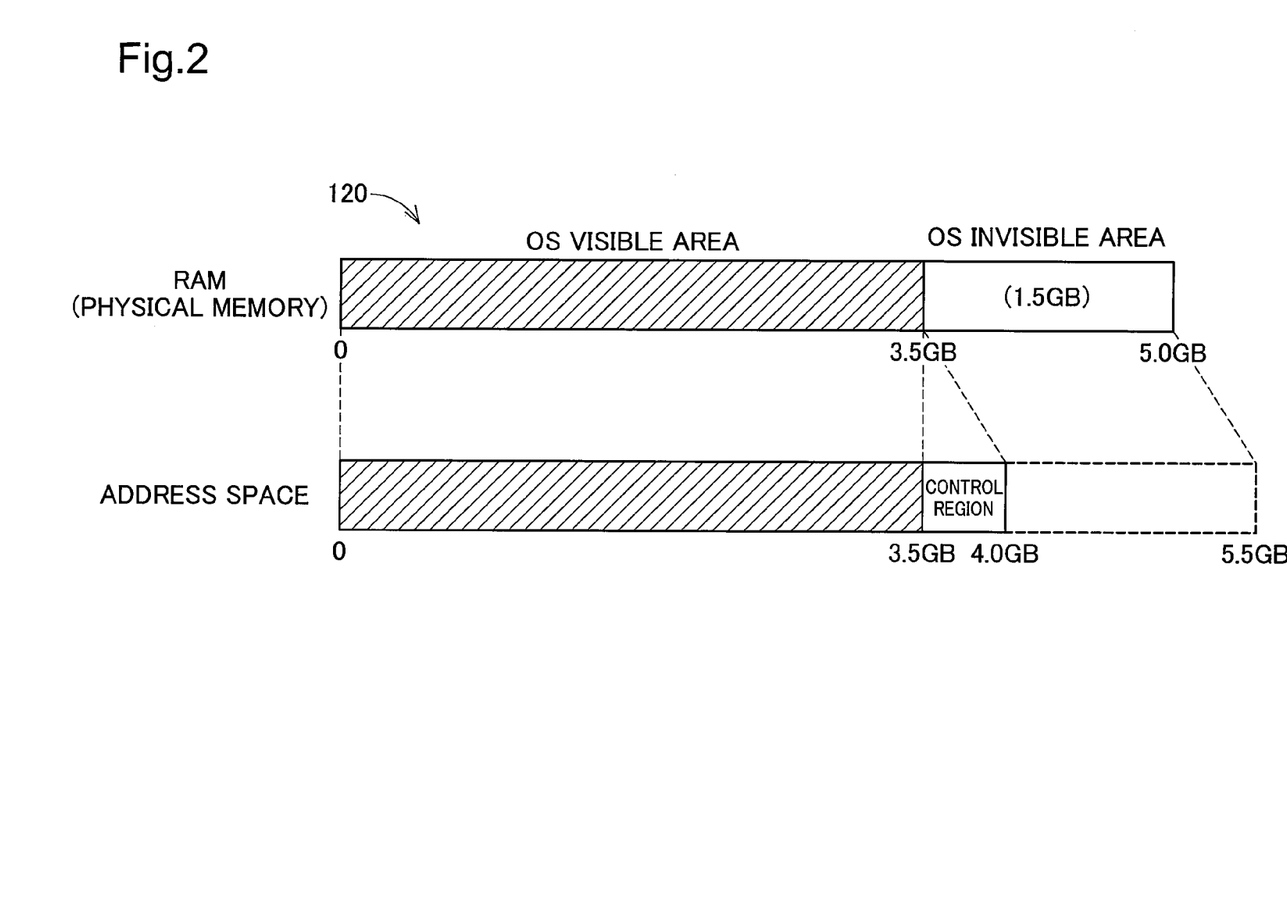
FIG. 2 is an explanatory diagrammatic representation of a memory area of a RAM and allocation of an address space in the computer of the embodiment.

FIG. 2 is an explanatory diagrammatic representation of the memory area of the RAM 120 as a physical memory and allocation of an address space in the computer 100. In this embodiment, it is assumed that the RAM 120 has a storage capacity of 5.0 gigabytes (GB). The 32-bit OS is generally allowed to provide an address space of the capacity of up to 4.0 GB. A fixed memory region used for the I/O device control and the system control is set at the end of the 4.0 GB address space. In the specification hereof, this fixed memory region is referred to as 'control region'. A memory region having a capacity of, for example, 0.5 GB may be set as the control region.

In the address space, a memory region from a starting address to the beginning of the control region is allocated to manage the physical memory. Since the memory region of the 0.5 GB capacity is used for the control region in the 4.0 GB address space provided by the 32-bit OS, only a memory area of up to 3.5 GB from the head is manageable by the OS out of the whole 5.0 GB storage capacity of the RAM 120. In the specification hereof, a memory area managed by the OS is called 'OS visible area', and a memory area beyond management by the OS is called 'OS invisible area'. The OS 111 and various programs including device drivers, as well as various data utilized by such programs are stored in the OS visible area on the RAM 120. The OS 111 and the programs are enabled to have direct access to the various data stored in the OS visible area on the RAM 120.

In the computer 100 of this embodiment, the RAM disk driver 112 sets a memory region as an additional address space after the control region and allocates the additional address space to the OS invisible area on the RAM 120. In the illustrated example of FIG. 2, a memory region of a 4.0 GB-position to a 5.5 GB-position (shown by the broken line) as the additional address space after the control region is set and is allocated to the OS invisible area having a storage capacity of 1.5 GB on the RAM 120. The RAM disk driver 112 is enabled to access the OS invisible area on the RAM 120 and sets a storage area of the RAM disk 122 as a virtual external storage in the OS invisible area on the RAM 120.

Figure 3:
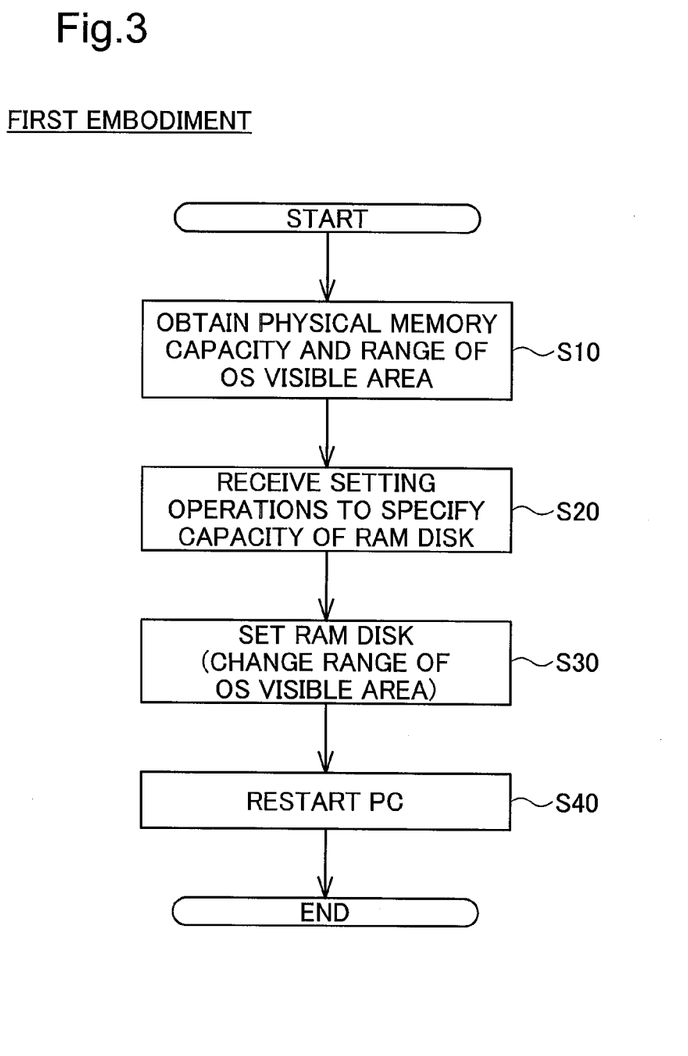
FIG. 3 is a flowchart showing a processing flow executed by a RAM disk driver to set a RAM disk in the computer of the first embodiment.

FIG. 3 is a flowchart showing a processing flow executed by the RAM disk driver 112 to set the RAM disk 122 in the computer 100 of the first embodiment. At step S10, the RAM disk driver 112 obtains the capacity of the physical memory of the computer 100 or the capacity of the RAM 120 and the range of the OS visible area on the RAM 120. Specifically the storage area setting module 112b may obtain these pieces of information from a device control program, such as BIOS (Basic Input Output System). At step S20, the interface module 112a receives the user's setting operations for specifying the capacity of the RAM disk 122.

Figure 4A:
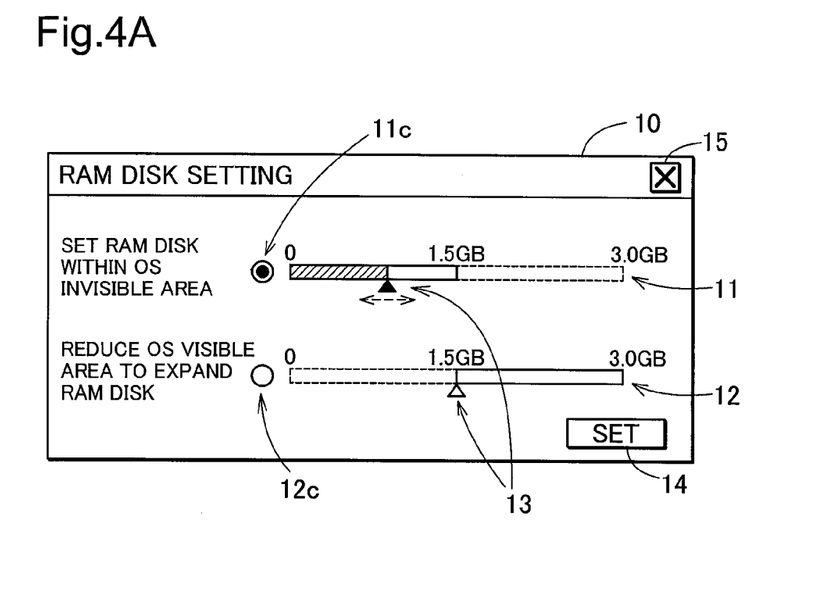
FIGS. 4A and 4B are explanatory diagrammatic representations of an operation screen image displayed to allow for the user's specification for a capacity of the RAM disk.
Figure 4B:
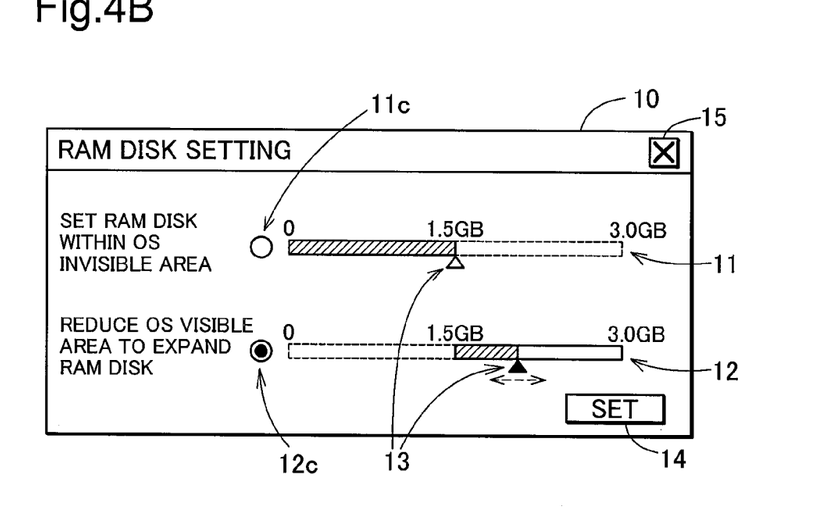

FIGS. 4A and 4B are explanatory diagrammatic representations of an operation screen image 10 displayed on the display unit 140 of the computer 100 by the interface module 112a. The user of the computer 100 is allowed to specify the capacity of the RAM disk 122 through operations on the operation screen image 10. The operation screen image 10 includes first and second level bars 11 and 12, first and second checkboxes 11c and 12c, sliders 13, a Set button 14, and a Close button 15.

In the state of FIG. 4A, the user is operating the first level bar 11. In the state of FIG. 4B, the user is operating the second level bar 12. Each of the first and second level bars 11 and 12 is an image object of a component bar chart representing the capacity of the RAM disk 122. In this embodiment, the user is allowed to specify a desired capacity in a range of 0 GB to 3.0 GB as the capacity of the RAM disk 122. For example, the user may operate the first level bar 11 to specify the capacity of the RAM disk 122 within a range corresponding to the capacity of the OS invisible area on the RAM 120 (e.g., within a range of 0 GB to 1.5 GB). The user may alternatively operate the second level bar 12 to specify the capacity of the RAM disk 122 beyond the capacity of the OS invisible area.

In response to the user's operation of the first level bar 11 to specify the capacity of the RAM disk 122, the RAM disk driver 112 performs a series of processing (described later) to set the RAM disk 122 without changing the range of the OS visible area. In response to the user's operation of the second level bar 12 to specify the capacity of the RAM disk 122, on the other hand, the RAM disk driver 112 reduces the range of the OS visible area on the RAM 120 according to the specified capacity of the RAM disk 122.

A concrete example of the user's setting operations performed on the operation screen image 10 is explained. The user makes a checkmark (expressed by a closed circle in the illustration of FIGS. 4A and 4B) in either of the first and second checkboxes 11c and 12c provided respectively corresponding to the first and second level bars 11 and 12 to select an operation object. The user then shifts an object slider 13 of the selected operation object (expressed by a closed triangle in the illustration of FIGS. 4A and 4B), out of the sliders 13 provided corresponding to the first and second level bars 11 and 12, to a specific position representing the user's desired capacity on the first or second level bar 11 or 12 and click the Set button 14. This series of operations specifies the capacity of the RAM disk 122.

The user's setting operations may be cancelled when the user presses the Close button 15 without pressing the Set button 14. In one preferable application, a confirmation message may be displayed after the user's click of the Set button 14 to ask the user to confirm the settings. The confirmation message may be designed to allow the user to select approval for or cancellation of the settings.

Referring back to the flowchart of FIG. 3, at step S30, the RAM disk driver 112 performs a series of processing to set the RAM disk 122 in the computer 100. Specifically the storage area setting module 112b edits a boot file to allocate an address space to the OS invisible area on the RAM 120 and cause the RAM disk driver 112 to be loaded by the CPU 110 on a restart of the computer 100.

When the user specifies the capacity of the RAM disk 122 beyond the range of the OS invisible area at step S20, the storage area setting module 112b performs the following series of processing to reduce the range of the OS visible area. The storage area setting module 112b computes a difference between whole storage capacity of the RAM 120 and the capacity of the RAM disk 122 specified by the user to determine a reduced range of the OS visible area. In order to specify the reduced range of the OS visible area, the storage area module 112b writes a switch of '/MAXMEM=nn' for setting a maximum memory capacity available for the OS 111 in the boot.ini file included in the boot file for the OS 111. The switch of '/MAXMEM=nn' is used to specify the capacity of the physical memory allocated to the OS visible area in megabyte (MB) units. When a memory region of a 0 GB-position to a 2.0 GB-position is to be specified as the reduced range of the OS visible area, a switch of '/MAXMEM=2048' is written in the Boot.ini file.

At step S40, the interface module 112a displays a message for a restart of the computer 100 on the display unit 140 and prompts the user to restart the computer 100. On the restart of the computer 100, the CPU 110 reads the boot file edited at step S30. This enables allocation of an address space to the OS invisible area on the RAM 120 and loading of the RAM disk driver 112 to set a storage area of the RAM disk 122 in the OS invisible area on the RAM 120.

Figure 5A:
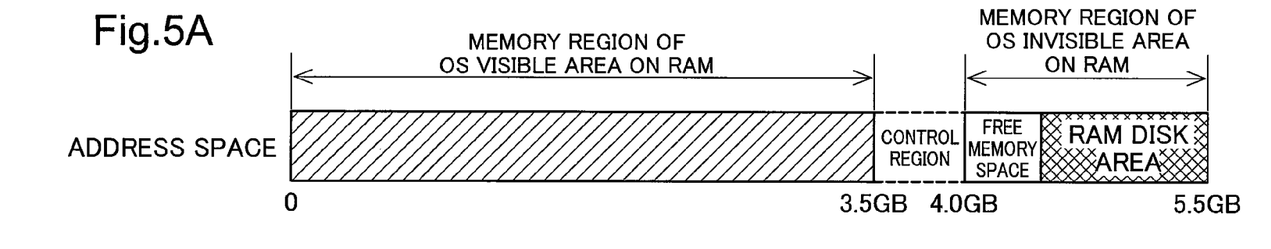
FIGS. 5A through 5C are explanatory diagrammatic representations of examples of allocation of the address space after a restart of the computer.
Figure 5B:
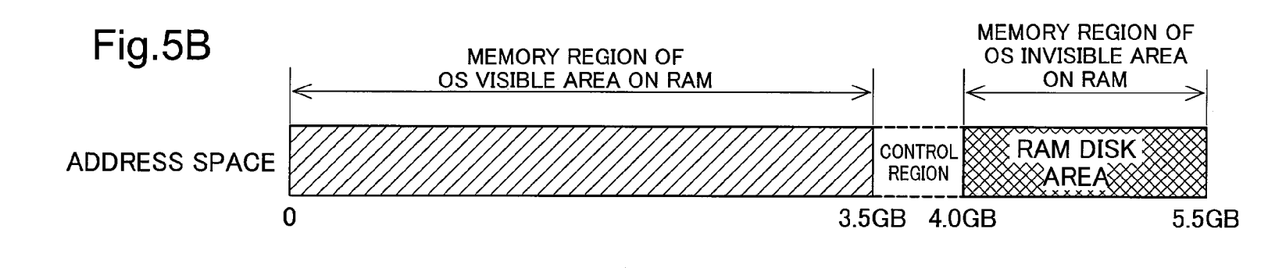
Figure 5C:
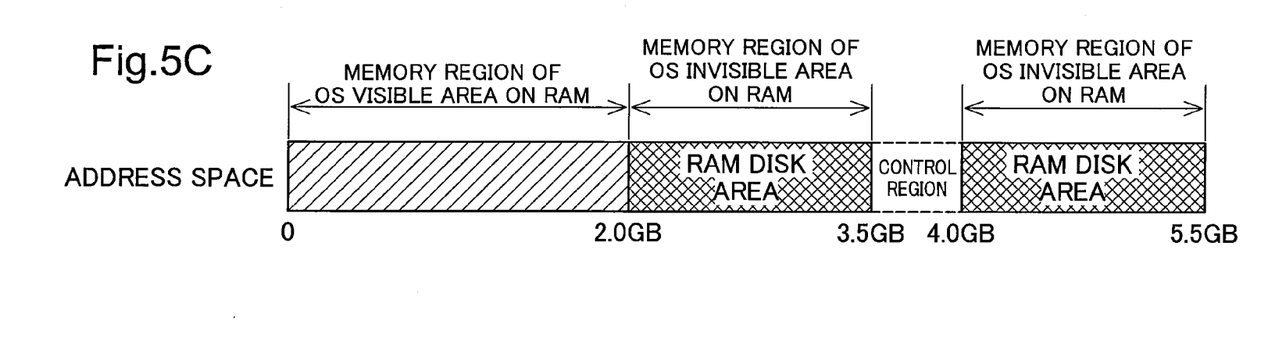

FIGS. 5A through 5C are explanatory diagrammatic representations of examples of allocation of the address space after the restart of the computer 100 at step S40. For the convenience of illustration, the control region is shown by the broken line in the illustrations of FIGS. 5A through 5C.

FIG. 5A shows allocation of the address space when the user specifies the capacity of the RAM disk 122 smaller than the capacity of the OS invisible area on the RAM 120 at step S20. In this case, the RAM disk driver 112 sets a continuous region starting from the end of the OS invisible area to the user's specified capacity on the RAM 120 for the storage area of the RAM disk 122 without changing the range or memory region of the OS visible area on the RAM 120 (e.g., a range of a 0 GB-position to a 3.5 GB-position). There is accordingly a free memory space left in the OS invisible area on the RAM 120.

FIG. 5B shows allocation of the address space when the user specifies the capacity of the RAM disk 122 equal to the capacity of the OS invisible area on the RAM 120 at step S20. In this case, the whole memory region of the OS invisible area on the RAM 120 is set for the storage area of the RAM disk 122 having the user's specified capacity. FIG. 5C shows allocation of the address space when the user specifies the capacity of the RAM disk 122 greater than the capacity of the OS invisible area on the RAM 120 at step S20. In this case, the RAM disk driver 112 reduces the range of the OS visible area on the RAM 120 and expands the OS invisible area on the RAM 120 to include two continuous regions before and after the control region. The storage area of the RAM disk 122 having the user's specified capacity is set in the expanded OS invisible area on the RAM 120. In the illustrated example of FIG. 5C, the memory region of the OS visible area on the RAM 120 is reduced to a range of a 0 GB-position to a 2.0 GB-position, and the whole memory region of the expanded OS invisible area on the RAM 120 is set for the storage area of the RAM disk 122 having the user's specified capacity.

Figure 6A:
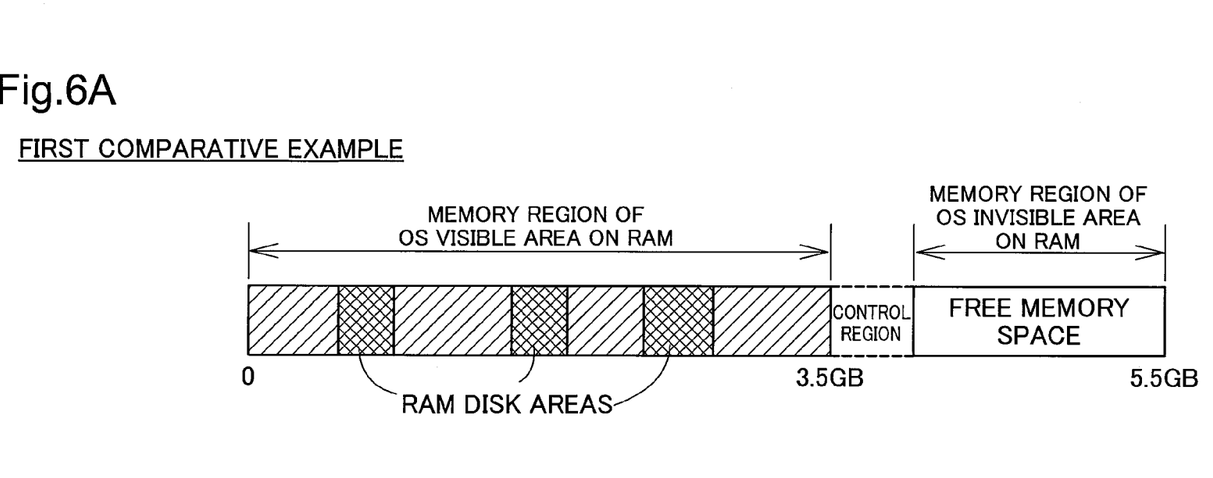
FIGS. 6A and 6B are explanatory diagrammatic representations of allocation of the address space in first and second comparative examples.

FIGS. 6A and 6B are explanatory diagrammatic representations of allocation of the address space in first and second comparative examples. FIG. 6A shows allocation of the address space where the storage area of the RAM disk 122 is allocated to only the OS visible area on the RAM 120 as the first comparative example. The OS 111 dynamically allocates the storage area of the RAM disk 122 in the OS visible area on the RAM 120. Namely the OS 111 repeats allocation and deallocation of the storage area required for the RAM disk 122 in response to a request from each program. The repeated allocation and deallocation causes the storage area of the RAM disk 122 to be divided and set into separate small regions. Such division of the storage area of the RAM disk 122 into the separate small regions lowers the access speed to the RAM disk 122. In the first comparative example, the OS invisible area on the RAM 120 is left as a free memory space.

Figure 6B:
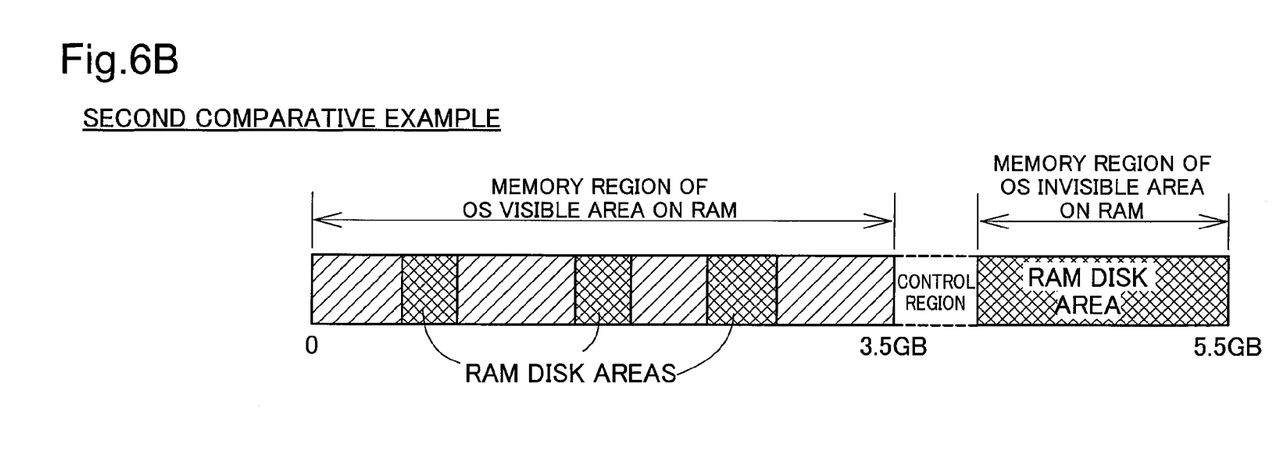

FIG. 6B shows allocation of the address space where the storage area of the RAM disk 122 is allocated to the OS visible area and the OS invisible area on the RAM 120 as the second comparative example. In this second comparative example, even when the user specifies the capacity of the RAM disk 122 beyond the capacity of the OS invisible area on the RAM 120, the range of the OS visible area on the RAM 120 is not changed. In this case, the storage area of the RAM disk 122 is separately allocated to the OS visible area and the OS invisible area on the RAM 120. A continuous memory region is set for the storage area of the RAM disk 122 allocated to the OS invisible area, while separate discontinuous memory regions are set for the storage area of the RAM disk 122 allocated to the OS visible area. This arrangement of the second comparative example also lowers the access speed to the RAM disk 122.

In the computer 100 of the embodiment described above, the RAM disk driver 112 changes the range of the OS visible area on the RAM 120 according to the user's specified capacity of the RAM disk 122. A continuous region in the OS invisible area is set for the storage area of the RAM disk 122. This arrangement preferably increases the access speed to the RAM disk 122 and assures the effective use of the OS invisible area on the RAM 120.

B. Second Embodiment

Figure 7:
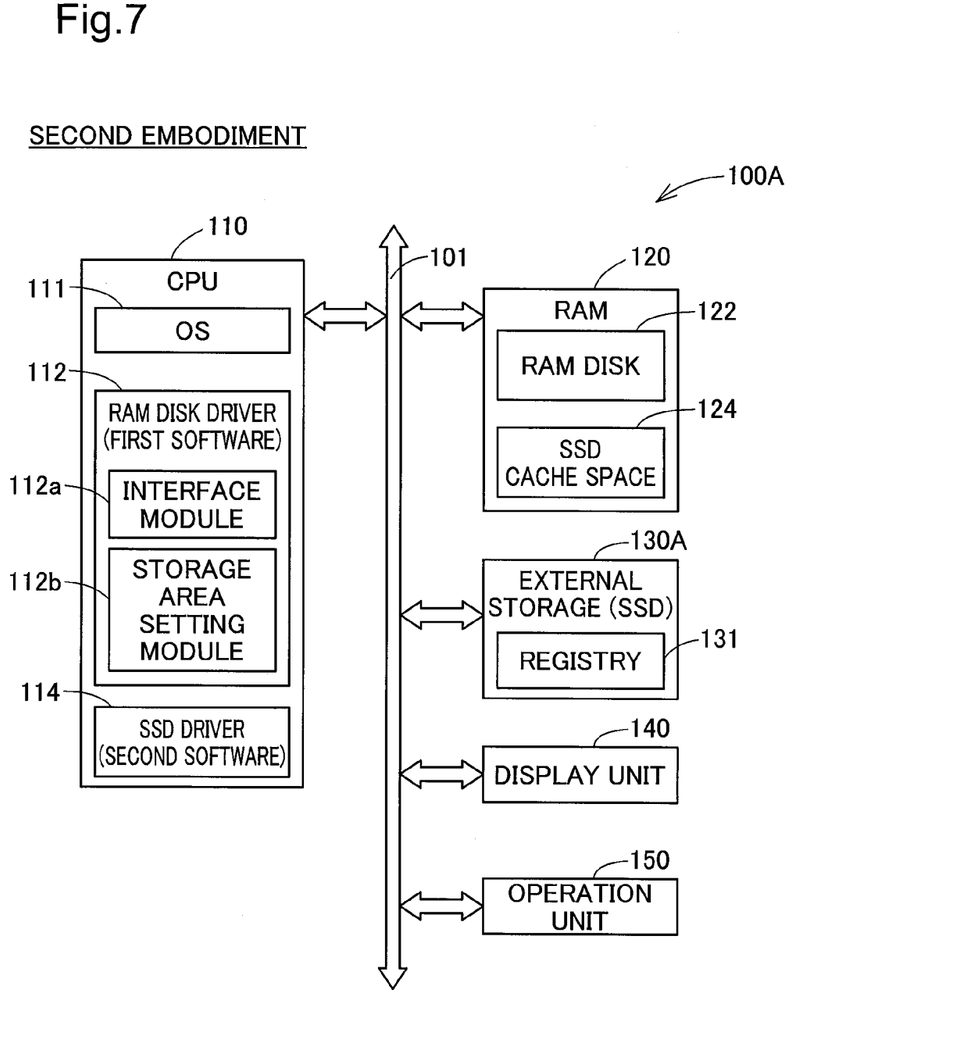
FIG. 7 is a schematic diagrammatic representation of the configuration of a computer according to a second embodiment of the invention.

FIG. 7 is a schematic diagrammatic representation of the configuration of a computer 100A according to a second embodiment of the invention. The computer 100A of the second embodiment shown in FIG. 7 has the similar configuration to that of the computer 100 of the first embodiment shown in FIG. 1, except that the CPU 110 executes an SSD driver 114, an SSD cache space 124 is added to the RAM 120, and an external storage 130A is implemented as a solid state drive (SSD). In the computer 100A of the second embodiment, the same components as those in the first embodiment are expressed by the same numerals and symbols and are not specifically described here.

The SSD driver 114 is used to control the external storage or SSD 130A. The SSD 130A is a storage device with multiple flash memories connected in parallel. The SSD driver 114 is corresponding to second software of the invention. The storage area of the flash memory is structured in block units, and the operation of writing data into the flash memory and the operation of deleting data from the flash memory are also performed in block units. A data update process on the flash memory first deletes the existing data from the flash memory and newly writes update data into the flash memory. The data erasing and writing operations are thus performed in the block units in the SSD even for updating a very small volume of data. This tends to increase the rate of the required update time to the data volume in the data update process. The user may thus feel the low access speed to the SSD 130A.

In the computer 100A of the second embodiment, the SSD driver 114 sets the SSD cache space 124 in the OS invisible area on the RAM 120 and thereby efficiently accesses the SSD 130A. This enables the user to apparently feel the enhanced access speed to the SSD 130A. A concrete access procedure of the SSD driver 114 to the SSD 130A will be described later.

In the same manner as described above with regard to the computer 100 of the first embodiment, in the computer 100A, the RAM disk driver 112 sets the storage area of the RAM disk 122 in the OS invisible area on the RAM 120. In the computer 100A, the two storage areas are accordingly set in the OS invisible area on the RAM 120 by the two different programs. The OS invisible area is beyond management by the OS 111, so that there is a possibility that the two programs individually set partially or fully overlapped storage areas in the OS invisible area. The computer 100A of the second embodiment performs the following series of processing to cause the RAM disk driver 112 and the SSD driver 114 to individually set different storage areas with no overlap in the OS invisible area on the RAM 120.

Figure 8:
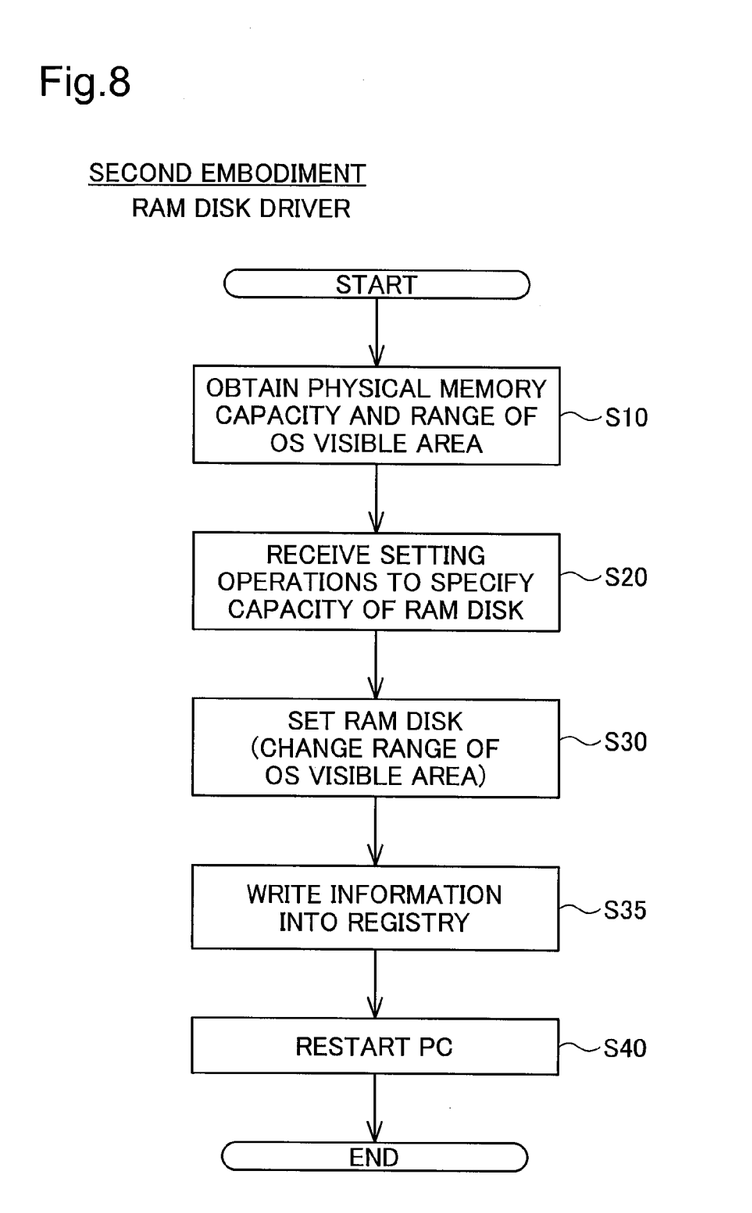
FIG. 8 is a flowchart showing a processing flow executed by the RAM disk driver to set the RAM disk in the computer of the second embodiment.

FIG. 8 is a flowchart showing a processing flow executed by the RAM disk driver 112 to set the RAM disk 122 on the RAM 120 in the computer 100A of the second embodiment. The processing flow of the second embodiment shown in FIG. 8 is substantially similar to the processing flow of the first embodiment shown in FIG. 3, except insertion of one additional step S35. The RAM disk driver 112 performs the same series of processing at steps S10 to S30 as that described in the first embodiment. Specifically the RAM disk driver 112 receives the user's setting operations for specifying the capacity of the RAM disk 122 and causes the RAM disk 122 of the user's specified capacity to be set in the OS invisible area on the RAM 120 on a restart of the computer 100A.

At step S35, the RAM disk driver 112 writes information regarding a free memory space in the OS invisible area on the RAM 120, which is not allocated to the RAM disk 122, into a registry 131. Here the term 'registry' represents a database used to store configuration settings on Microsoft Windows operating systems and application software. In the computer 100A of this embodiment, the registry 131 is stored in the SSD 130A. The 'information regarding a free memory space in the OS invisible area on the RAM 120' may include, for example, address information for specifying a portion of the OS invisible area that is not allocated to the storage area of the RAM disk 122 and the capacity of the specified portion.

Figure 9:
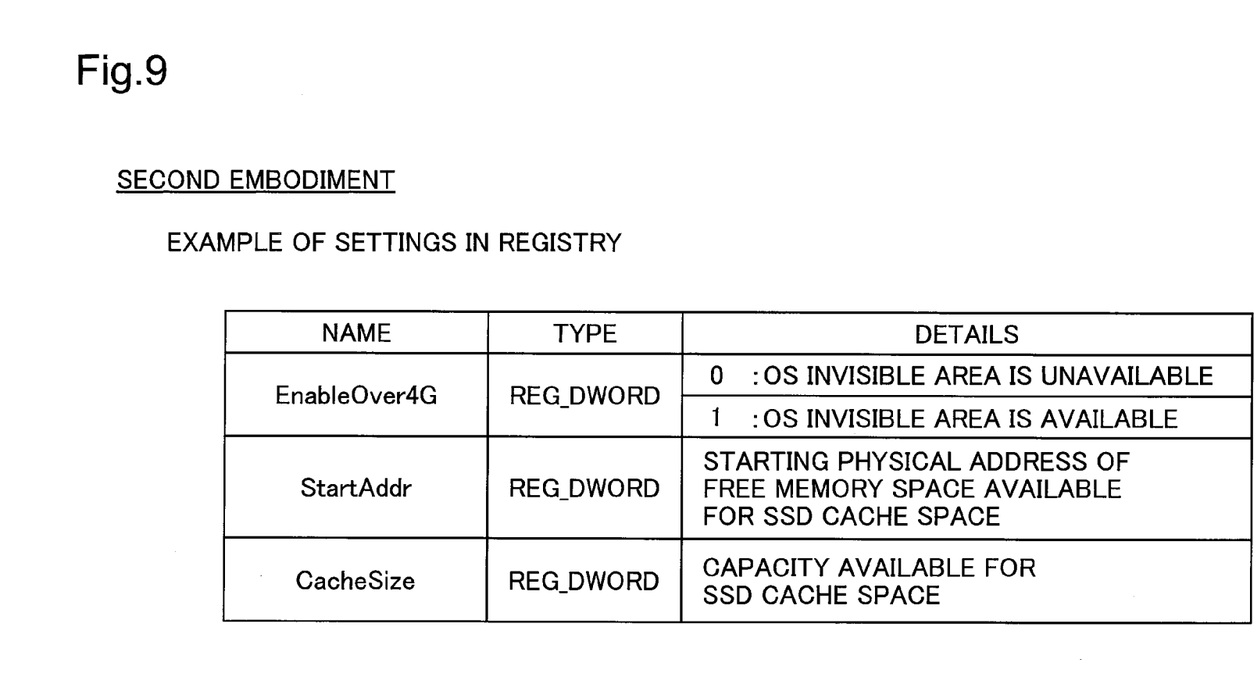
FIG. 9 is an explanatory diagrammatic representation of one example of registry settings.

FIG. 9 is an explanatory diagrammatic representation of one example of the settings written into the registry 131 by the RAM disk driver 112. The RAM disk driver 112 writes either a value '1' or a value '0' under a name of 'EnableOver4G' into the registry 131. A type 'REG_DWORD' represents registration of numerical data. In the state that the OS invisible area on the RAM 120 has no free memory space and is thus unavailable for further storage, the RAM disk driver 112 writes the value '0' in 'EnableOver4G'. In the state that the OS invisible area on the RAM 120 has any free memory space and is thus available for further storage, the RAM disk driver 112 writes the value '1' in 'EnableOver4G'.

The RAM disk driver 112 stores a starting address of a free memory space in the OS invisible area under a name of 'StartAddr' into the registry 131. Namely the starting physical address of the free memory space available for the SSD cache space 124 is stored in 'StartAddr'. The RAM disk driver 112 stores the capacity of the free memory space in the OS invisible area on the RAM 120 under a name of 'CacheSize' into the registry 131. Namely the capacity of the free memory space available for the SSD cache space 124 in the OS invisible area on the RAM 120 is stored in 'CacheSize'.

At step S40, the RAM disk driver 112 displays a message for a restart of the computer 100A on the display unit 140 and prompts the user to restart the computer 100A. On the restart of the computer 100A, the RAM disk driver 112 is loaded to set the RAM disk 122 in the OS invisible area on the RAM 120 according to the settings of the edited boot file.

Figure 10:
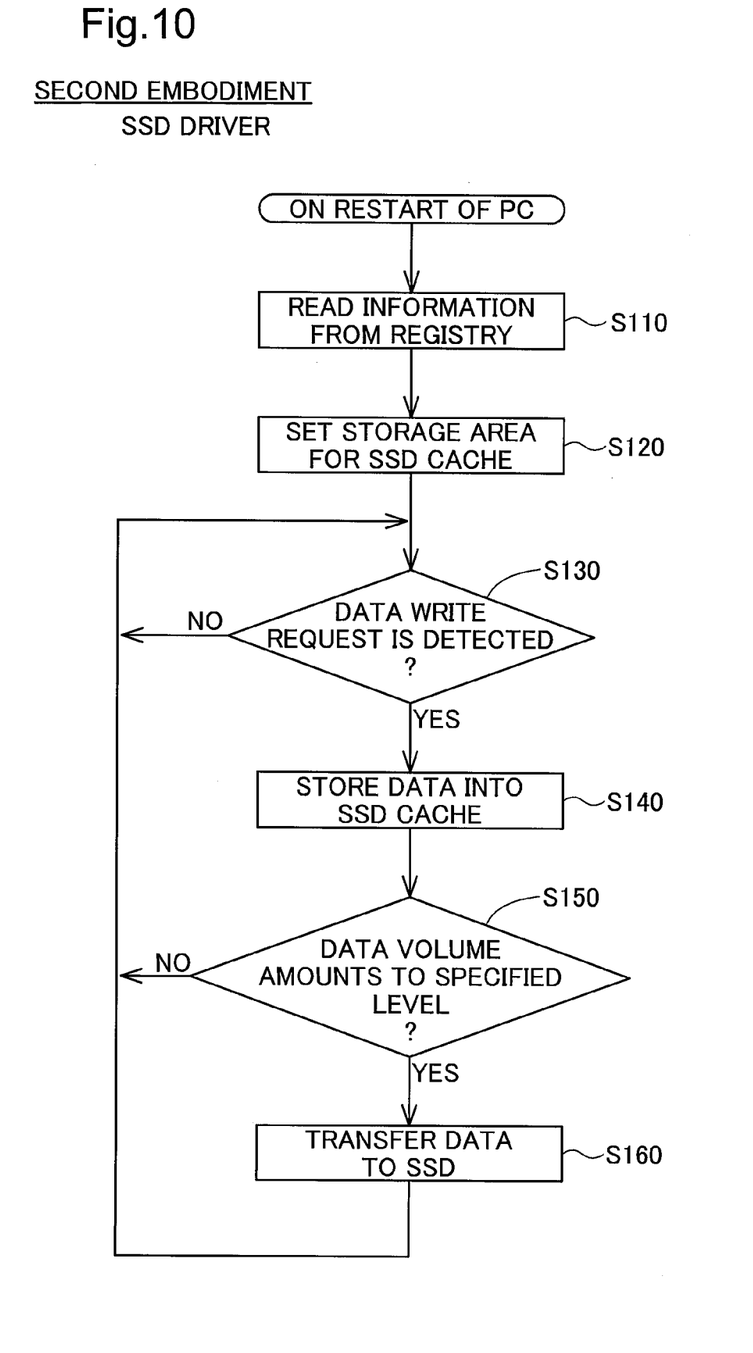
FIG. 10 is a flowchart showing a processing flow executed by an SSD driver to set an SSD cache space on the RAM.

FIG. 10 is a flowchart showing a processing flow executed by the SSD driver 114 to set the SSD cache space 124 on the RAM 120. This processing flow is triggered by a restart of the computer 100A at step S40 of FIG. 8. The boot file is set in advance to cause the CPU 110 to automatically load the SSD driver 114 on a restart of the computer 100A. In the computer 100A prior to a restart, the SSD driver 114 itself may specify this setting in the boot file.

At step S110, the SSD driver 114 reads out the information written into the registry 131 by the RAM disk driver 112 at step S35 of FIG. 8. At step S120, the SSD driver 114 sets a storage area of the SSD cache space 124 on the RAM 120, based on the information read from the registry 131 and a capacity of the SSD cache space 124 to be set. The 'capacity of the SD cache space 124' may be a capacity specified by the user in the computer 100A prior to a restart or may be a default capacity specified in the SSD driver 114.

A concrete procedure of step S120 is described on the assumption that the SSD driver 114 reads the settings of FIG. 9 from the registry 131 at step S110. When 'EnableOver4G' stores the value '0' in the registry 131, the OS invisible area on the RAM 120 has no free memory space available for the SSD cache space 124. The SSD driver 114 accordingly requests the OS 111 to set a storage area of the SSD cache space 124 in the OS visible area on the RAM 120.

When 'EnableOver4G' stores the value '1' in the registry, on the other hand, the SSD driver 114 sets a storage area of the SSD cache space 124 preferentially in the OS invisible area on the RAM 120. More specifically the SSD driver 114 reads the starting address stored in 'StartAddr' from the registry 131 and sets a continuous memory region starting from this starting address corresponding to the specified capacity of the SSD cache space 124. When the specified capacity of the SSD cache space 124 is greater than the capacity stored in 'CacheSize' in the registry 131, the SSD driver 114 allocates the whole free memory space in the OS invisible area on the RAM 120 to a storage area of the SSD cache space 124 and requests the OS 111 to allocate a portion of the OS visible area on the RAM 120 and supply a deficiency of the OS invisible area to cover the required capacity.

Figure 11A:
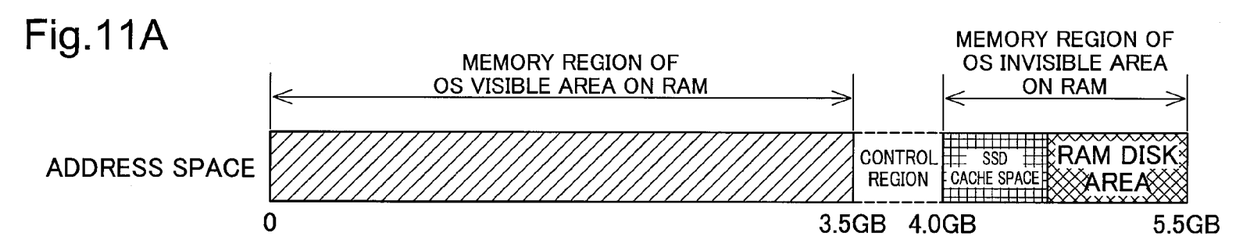
FIGS. 11A through 11C are explanatory diagrammatic representations of examples of allocation of the address space to set the RAM disk and the SSD cache space on the RAM.
Figure 11B:
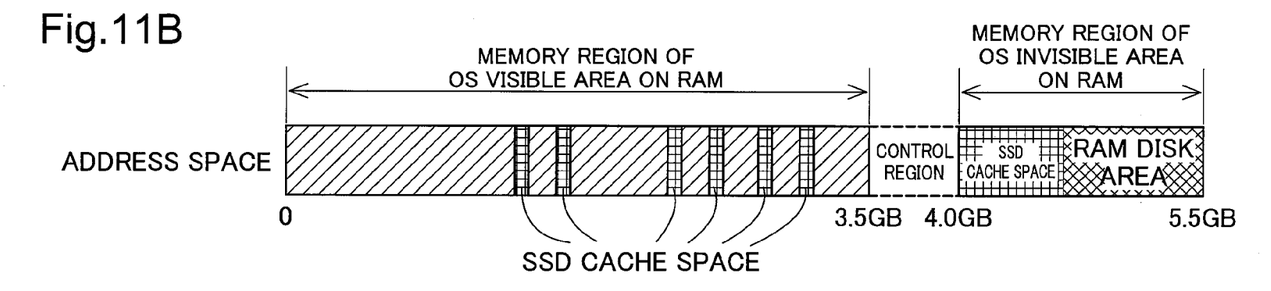
Figure 11C:
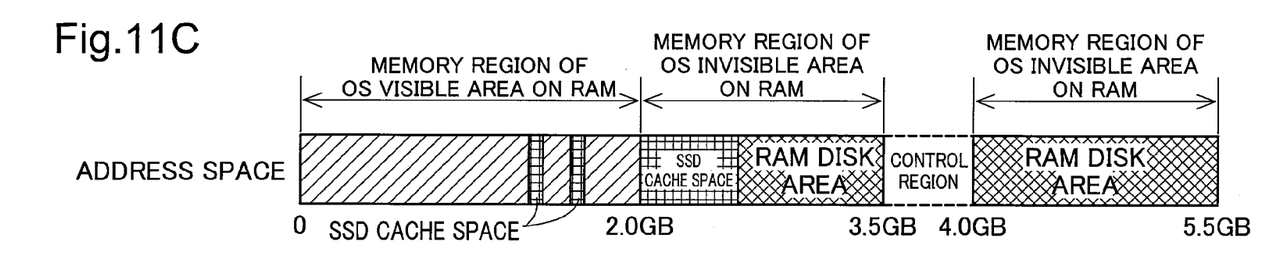

FIGS. 11A through 11C are explanatory diagrammatic representations of examples of allocation of the address space to set the RAM disk 122 and the SSD cache space 124 on the RAM 120. FIG. 11A shows allocation of the address space when the storage area of the RAM disk 122 and the storage area of the SSD cache space 124 are set only in the OS invisible area on the RAM 120. As described above with regard to the first embodiment, a continuous region starting from the end of the OS invisible area on the RAM 120 to the user's specified capacity is set for the storage area of the RAM disk 122. A free memory space left in the OS invisible area on the RAM 120 as a remaining region other than the continuous region allocated to the RAM disk 122 is set for the storage area of the SSD cache space 124, based on the information written in the registry 131.

In the example of FIG. 11A, the whole remaining region of the free memory space left in the OS invisible area on the RAM 120 is set for the storage area of the SSD cache space 124. When the sum of the user's specified capacity of the RAM disk 122 and the specified capacity of the SSD cache space 124 is smaller than the capacity of the OS invisible area on the RAM 120, there is still a free memory space left in the OS invisible area on the RAM 120.

FIG. 11B shows allocation of the address space when the required capacity for the SSD cache space 124 is not sufficiently coverable by the remaining region of the free memory space left in the OS invisible area on the RAM 120. In this case, the SSD driver 114 requests the OS 111 to allocate a portion of the OS visible area on the RAM 120 and supply a deficiency of the OS invisible area to cover the required capacity for the SSD cache space 124 as explained above. In one preferable application, a portion of the OS visible area on the RAM 120 is allocated to the storage area of the SSD cache space 124 in units of a block capacity (for example, 64 kB) as a data management unit in the SSD 130A or of a fixed length capacity corresponding to half the size of the block capacity.

FIG. 11C shows allocation of the address space when the memory region of the OS visible area on the RAM 120 is reduced to a range of a 0 GB-position to a 2.0 GB-position and when both the RAM disk 122 and the SSD cache space 124 are set in the OS invisible area. When the SSD cache space 124 has a known capacity, the RAM disk driver 112 may reduce the memory region of the OS visible area on the RAM 120 according to the sum of the capacity of the RAM disk 122 and the capacity of the SSD cache space 124. Alternatively the RAM disk driver 112 may make extra reduction of the memory region of the OS visible area on the RAM disk 120 in order to enable at least part of the SSD cache space 124 to be set in the OS invisible area on the RAM 120.

Referring back to the flowchart of FIG. 10, after setting the SSD cache space 124 on the RAM 120 at step S120, the SSD driver 114 starts monitoring a data write request for writing data into the SSD 130A at step S130. In response to detection of the data write request, the SSD driver 114 stores the relevant data into the SSD cache space 124 at step S140. Since the data writing speed into the SSD cache space 124 on the RAM 120 is higher than the data writing speed directly into the SSD 130A, the user apparently feels the enhanced data writing speed into the SSD 130A.

At step S150, the SSD driver 114 determines whether the data volume stored in the SSD cache space 124 amounts to a specified level. Upon determination that the data volume stored in the SSD cache space 124 has already reached the specified level, the SSD driver 114 transfers the data stored in the SSD cache space 124 to the SSD 130A at step S160. Upon determination that the data volume stored in the SSD cache space 124 has not yet reached the specified level, the SSD driver 114 goes back to step S130 to restart monitoring a data write request for writing data into the SSD 130A. On completion of the data transfer at step S160, the SSD driver 114 also goes back to step S130 to restart monitoring a data write request for writing data into the SSD 130A.

The processing of steps S130 to S160 causes the SSD cache space 124 to function as a disk cache of the SSD 130A. Namely setting the SSD cache space 124 improves the user's 'perceived' data transfer speed to the SSD 130A and reduces the frequency of accesses to the SSD 130A to enhance the efficiency of access to the SSD 130A.

As described above, the computer 100A of the second embodiment enables the RAM disk 122 and the SSD cache space 124 to be set as continuous regions without any overlap in the OS invisible area on the RAM 120. This arrangement effectively increases the access speeds to the RAM disk 122 and the SSD cache space 124.

C. Other Aspects

The invention is not limited to any of the embodiments and their applications discussed above but may be actualized in diversity of other embodiments and applications within the scope of the invention. Some examples of possible modification are given below.

C1. Modified Example 1

In the embodiments described above, at least part of the hardware configuration may be replaced by the software configuration. On the contrary, at least part of the software configuration may be replaced by the hardware configuration. Part of the functions of the RAM disk driver 112 may be performed by another program or hardware.

C2. Modified Example 2

In the embodiments described above, the 32-bit OS is installed in the computers 100 and 100A. A 64-bit OS may alternatively be installed in the computer. The 64-bit OS generally sets a memory region of 8 GB to 128 GB in a RAM physical memory for an OS visible area. A memory region excluding the memory region set for the OS visible area in the physical memory is used for an OS invisible area.

C3. Modified Example 3

In the embodiments described above, when the user's specified capacity of the RAM disk 122 is greater than the capacity of the OS invisible area on the RAM 120, the RAM disk driver 112 reduces the memory region of the OS visible area on the RAM 120. In one modification, when the user's specified capacity of the RAM disk 122 is less than the capacity of the OS invisible area on the RAM 120, the RAM disk driver 112 may expand the memory region of the OS visible area and thereby reduce the free memory space in the OS invisible area on the RAM 120.

C4. Modified Example 4

In the embodiments described above, the RAM disk driver 112 sets a continuous region starting from the end of the OS invisible area for the storage area of the RAM disk 122. In one modification, the RAM disk driver 112 may set a continuous region at any arbitrary position in the OS invisible area for the storage area of the RAM disk 122.

C5. Modified Example 5

In the embodiments described above, the RAM disk driver 112 creates the Boot.ini file including the switch of '/MAXMEM=nn' to change the range of the OS visible area on the RAM 120. The RAM disk driver 112 may adopt any other suitable means to change the range of the OS visible area on the RAM 120. For example, when Windows XP is installed as the OS in the computer, the RAM disk driver 112 may create a Boot.ini file including a switch of '/BURNMEMORY=nn' to specify a memory capacity unavailable for the OS. In another example, when Windows Vista or Windows 7 is installed as the OS in the computer, the RAM disk driver 112 may edit boot configuration data to change the range of the OS visible area on the RAM 120. 'Windows XP' and 'Windows 7' are registered trademarks by Microsoft Corporation.

C6. Modified Example 6

In the embodiments described above, the RAM disk driver 112 receives the user's specification for the capacity of the RAM disk 122 via the operation screen image 10. In one modification, the RAM disk driver 112 may receive the user's specification for the range of the OS visible area on the RAM 120 via the operation screen image 10.

C7. Modified Example 7

In the second embodiment described above, the RAM disk driver 112 writes the information regarding the free memory space in the OS invisible area on the RAM 120, which is not allocated to the RAM disk 122, into the registry 131. The SSD driver 114 reads the information from the registry 131. In one modification, the RAM disk driver 112 may cause the SSD driver 114 to obtain the information by any other suitable means. For example, the information may be written in a preset storage location other than the registry 131 in the SSD 130A, which is determined in advance by the RAM disk driver 112 and the SSD driver 114.

C8. Modified Example 8

In the second embodiment described above, the RAM disk driver 112 sets the storage capacity of the RAM disk 122 preferentially in the OS invisible area on the RAM 120. In one modification, the SSD driver 114 may alternatively perform the series of processing, which is performed by the RAM disk driver 112 in the second embodiment, to set the storage area of the SSD cache space 124 preferentially over the storage area of the RAM disk 122 in the OS invisible area on the RAM 120.

C9. Modified Example 9

In the second embodiment described above, the computer 100A has the SSD 130A as the external storage and the SSD driver 114 as the device driver of the external storage. The computer 100A may be structured to have any suitable type of storage other than SSD as the external storage and a device driver of the external storage. The device driver may be executed to set a cache space for the external storage in the OS invisible area on the RAM 120.

C10. Modified Example 10

In the second embodiment described above, the SSD driver 114 reads the information written into the registry 131 by the RAM disk driver 112 and utilizes the OS invisible area on the RAM 120, based on the information. In one modification, another software, in place of the SSD driver 114, may read the information written into the registry 131 by the RAM disk driver 112 and utilize the OS invisible area on the RAM 120, based on the information.

What is claimed is:

1. A method of accelerating access to a primary storage by utilizing an invisible memory area, which is beyond management of an operating system installed in a computer, out of a memory area on the primary storage in the computer, wherein the primary storage includes a first memory area and a second memory area, the first memory area is located in the range of the memory area in which the operating system can provide an address space of maximum capacity, the second memory area is located out of the range of the memory area in which the operating system can provide the address space of maximum capacity, the invisible memory area includes the second memory area at least, and the method comprising the steps of:

(a) causing first software that utilizes a portion of the memory area on the primary storage as a RAM disk to receive a user's setting operation for specifying a capacity of the RAM disk; and (b) causing the first software to assign, on a start up of the computer, a continuous region in the invisible memory area as a storage area of the RAM disk having the capacity specified by the user's setting operation, wherein the step (b) causes the first software to change a range of a visible memory area, which is managed by the operating system, out of the first memory area on the primary storage according to the user's specified capacity of the RAM disk received in the step (a) to thereby assign both the second memory area and a portion of the first memory area in the invisible memory area as the storage area of the RAM disk.

2. The method in accordance with claim 1, further comprising the steps of:
   (c) causing the first software to write into a registry a range of a free memory space in the invisible memory area, which is not allocated to the storage area of the RAM disk; and
   (d) causing second software to assign a cache space, which is used for an external storage of the computer, preferentially from the free memory space of the invisible memory area, based on the range of the free memory space written into the registry in the step (c).

3. The method in accordance with claim 1, wherein the step (b) causes the first software to reduce the range of the visible memory area on the primary storage and to utilize a portion of the first memory area which deviates from the visible memory area as the storage area of the RAM disk, when the user's specified capacity of the RAM disk greater than the capacity of the second memory area.

4. A storage system adopted in a computer, comprising:
   a primary storage, a portion of which is managed by an operating system installed in the computer, the primary storage including a first memory area and a second memory area such that,
      the first memory area is located in the range of the memory area in which the operating system can provide an address space of maximum capacity,
      the second memory area is located out of the range of the memory area in which the operating system can provide the address space of maximum capacity, and
   first software arranged and adapted to utilize an invisible memory area, which is beyond management of an operating system installed in the computer and includes the second memory area at least, on the primary storage as a RAM disk, wherein the first software includes:
   an interface module arranged and adapted to receive a user's setting operation for specifying a capacity of the RAM disk; and
   a storage area setting module arranged and adapted to assign, on a start up of the computer, a continuous region in the invisible memory area as a storage area of the RAM disk having the capacity specified by the user's setting operation,
wherein the storage area setting module is arranged and adapted to change a range of a visible memory area, which is managed by the operating system, out of the first memory area on the primary storage according to the user's specified capacity of the RAM disk received by the interface module and to assign both the second memory area and a portion of the first memory area in the invisible memory area as the storage area of the RAM disk.

5. The storage system in accordance with claim 4, further comprising:
   second software arranged and adapted to use a portion of the memory area on the primary storage for a cache space for an external storage of the computer,
   wherein the first software is arranged and adapted to write into a registry a range of a free memory space in the invisible memory area, which is not allocated to the storage area of the RAM disk; and
   the second software is arranged and adapted to assign the cache space, which is used for the external storage, preferentially in the free memory space in the invisible memory area, based on the range of the free memory space written into the registry by the first software.

6. The storage system in accordance with claim 4, wherein the storage area setting module is arranged and adapted to reduce the range of the visible memory area on the primary storage and to utilize a portion of the first memory area which deviates from the visible memory area as the storage area of the RAM disk, when the user's specified capacity of the RAM disk greater than the capacity of the second memory area.

* * * * *